US011632417B2

(12) United States Patent
Kao et al.

(10) Patent No.: US 11,632,417 B2
(45) Date of Patent: Apr. 18, 2023

(54) IOT GATEWAY WITH CONFIGURABLE DATA TRANSMISSION MODE (71) Applicant: Moxa Inc., New Taipei (TW)

(72) Inventors: Chi-Yuan Kao, New Taipei (TW); Wen-Lung Hsu, New Taipei (TW)

(73) Assignee: Moxa Inc., New Taipei (TW)

( * ) Notice: Subject to any disclaimer, the term of this patent is extended or adjusted under 35 U.S.C. 154(b) by 0 days.

(21) Appl. No.: 17/503,353

(22) Filed: Oct. 17, 2021

(65) Prior Publication Data

US 2022/0232063 A1 Jul. 21, 2022

Related U.S. Application Data (60) Provisional application No. 63/138,814, filed on Jan. 19, 2021.

(30) Foreign Application Priority Data

Jul. 20, 2021 (TW) ................. 110126564

(51) Int. Cl.
*G06F 13/00* (2006.01)
*H04L 67/025* (2022.01)
*G16Y 40/10* (2020.01)
*H04L 12/46* (2006.01)
*H04L 49/90* (2022.01)
*H04L 67/12* (2022.01)

(52) U.S. Cl.
CPC ............ *H04L 67/025* (2013.01); *G16Y 40/10* (2020.01); *H04L 12/46* (2013.01); *H04L 49/90* (2013.01); *H04L 67/12* (2013.01)

(58) Field of Classification Search
CPC ....... H04L 67/025; H04L 12/46; H04L 49/90; H04L 67/12; G16Y 40/10; G16Y 40/00; G16Y 40/30; G16Y 40/35; H04W 4/38; H04W 4/70
USPC ....... 709/233, 224, 220–222, 249, 250, 203, 709/230
See application file for complete search history.

(56) References Cited

U.S. PATENT DOCUMENTS

| 10,007,513 | B2 * | 6/2018 | Malladi | ................... H04W 4/70 |
| 10,379,842 | B2 * | 8/2019 | Malladi | ................. H04L 67/561 |
| 10,805,426 | B2 * | 10/2020 | Papageorgiou | ......... H04W 4/02 |
| 11,048,498 | B2 * | 6/2021 | Malladi | ................. G05B 15/02 |
| 2017/0060574 | A1 | 3/2017 | Malladi | |
| 2018/0234519 | A1 | 8/2018 | Boyapalle | |

(Continued)

FOREIGN PATENT DOCUMENTS

| CN | 108650325 A | 10/2018 |
| CN | 111131014 A | 5/2020 |

(Continued)

*Primary Examiner* — Kenneth R Coulter
(74) *Attorney, Agent, or Firm* — Winston Hsu (57) ABSTRACT An IoT gateway with configurable data transmission mode includes a data collector, a data capturer and a data uploader. The data collector is configured to collect the data provided by a data provider based on a first data policy. The data capturer is configured to capture the data collected by the data collector based on a second data policy. The data uploader is configured to handle the data captured by the data capturer based on a third data policy. The first data policy, the second data policy and the third data policy may be configured separately according to different IoT applications.

22 Claims, 5 Drawing Sheets (56) References Cited

U.S. PATENT DOCUMENTS

2018/0300124 A1* 10/2018 Malladi ................. H04L 67/561
2019/0158625 A1*  5/2019 Papageorgiou ......... H04L 12/66
2019/0369984 A1* 12/2019 Malladi ............. H04L 12/40006
2021/0326128 A1* 10/2021 Malladi ..................... G06F 8/70

FOREIGN PATENT DOCUMENTS

| | | |
|---|---|---|
| CN | 111741092 A | 10/2020 |
| TW | M591741 U | 3/2020 |
| TW | M596379 U | 6/2020 |
| TW | M596476 U | 6/2020 |

\* cited by examiner

IOT GATEWAY WITH CONFIGURABLE DATA TRANSMISSION MODE

CROSS REFERENCE TO RELATED APPLICATIONS

This application claims priority of Taiwan Application No. 110126564 filed on 2021 Jul. 20 and U.S. Provisional Application No. 63/138,814 filed on 2021 Jan. 19.

BACKGROUND OF THE INVENTION

1. Field of the Invention

The present invention is related to an IoT gateway, and more particularly, to an IoT gateway with configurable data transmission mode.

2. Description of the Prior Art

The Internet of things (IoT) describes the network of physical objects—"things"—that are embedded with sensors, software, and other technologies for the purpose of connecting and exchanging data with other devices and systems over the Internet.

An IoT gateway is a solution for enabling IoT communication (usually device-to-cloud communications) and typically includes a data gateway, a network gateway and a security gateway. The data gateway is configured to gather data from local sensors with no network capability, and transmit the gathered data to the cloud for subsequent data processing and analysis. The network gateway is configured to provide interoperability between networks and contains devices, such as protocol translators, impedance matchers, rate converters, fault isolators, or signal translators. For example, the network gateway allows the IoT gateway to access a 4G mobile network for providing Internet access. The security gateway offers firewall policies to protect the network and the local sensors.

At its most basic level, the IoT gateway facilitates the connections between different data sources and destinations. For different application context, data types, network transmission bandwidth restriction, or the network transmission cost, the IoT Gateway must be appropriately designed, such as configuring the time to gather information from local data sources and the time to send the gathered information to the cloud. The following Table 1 to Table 4 illustrate some projects when implementing an IoT gateway based on application requirements and data types.

TABLE 1

| Operation | Frequency | Description |
| --- | --- | --- |
| Data gathering | every one hour | Analyzing long-term changes |
| Data upload | once per day | No urgency |

TABLE 2

| Operation | Frequency | Description |
| --- | --- | --- |
| Data gathering | When the water level exceeds the warning height (event occurs) | Monitor at any time |
| Data upload | instant (event occurs) | High urgency |

TABLE 3

| Operation | Frequency | Description |
| --- | --- | --- |
| Data gathering | every one hour | as per business needs |
| Data size | 100 byte | network restrictions |
| Data upload | Once per day, or when the size of data exceeds 2 MB | No urgency and no need to consider transmission cost |

TABLE 4

| Operation | Frequency | Description |
| --- | --- | --- |
| Data gathering | every one minute | as per business needs |
| Data upload | when the amount of gathered data exceeds 4 KB | Need to consider the cost of public cloud service |

Figure 1:
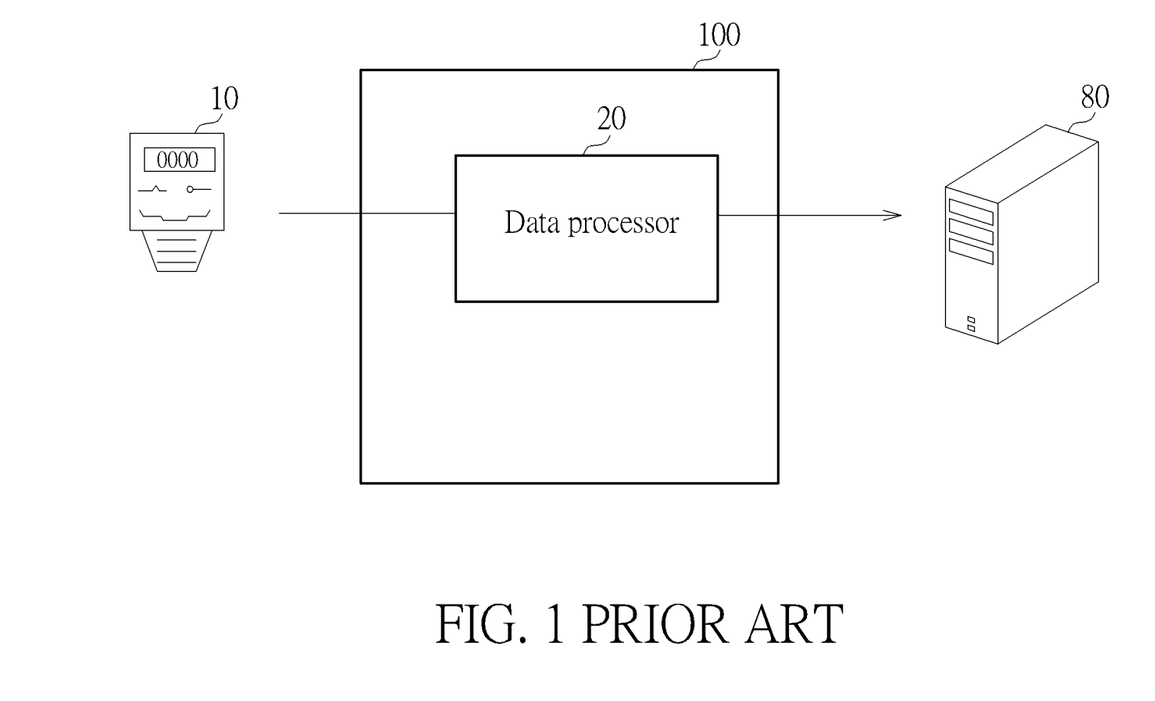
FIG. 1 is a diagram illustrating a prior art IoT gateway.

FIG. 1 is a diagram illustrating a prior art IoT gateway 100. The IoT gateway 100 includes a data processor 20 coupled between a data provider 10 and a data receiver 80. The data processor 20 is configured to gather data from the data provider 10 based on a predetermined time setting and send the gathered data to the data receiver 80 immediately.

Figure 2:
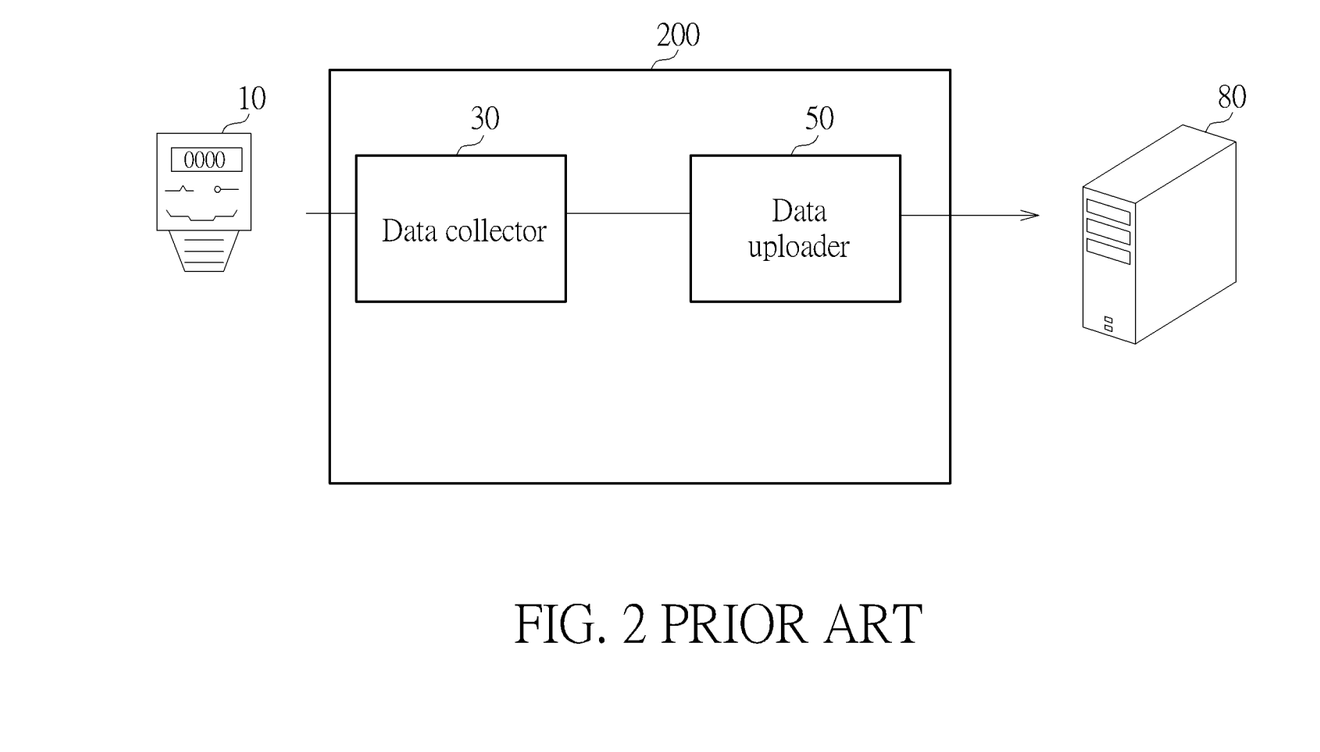
FIG. 2 is a diagram illustrating another prior art IoT gateway.

FIG. 2 is a diagram illustrating another prior art IoT gateway 200. The IoT gateway 200 includes a data collector 30 and a data uploader 50 coupled between a data provider 10 and a data receiver 80. The data collector 30 and the data uploader 50 may perform data transmission using a specific communication protocol. The data gathering time setting of the data collector 30 and the data uploading time setting of data uploader 50 may be set separately.

An IoT gateway may be required to handle tasks in different application scenarios, such as non-urgent data gathering over a long period of time and urgent instant data upload. Moreover, IoT gateways deployed in different regions may have different requirements for data gathering and data upload. When the application requirements change (which is normal in IoT applications), the source codes for running the data collector 30 and/or the data uploader 50 in the prior art IoT gateways 100 and 200 need to be modified, compiled, verified and tested before implemented on the IoT gateways 100 and 200, which takes a lot of effort and raises difficulties in system maintenance. Therefore, there is a need of an IoT gateway with configurable data movement mode for different applications without the need to modify related source codes.

SUMMARY OF THE INVENTION

The present invention provides an IoT gateway with configurable data transmission mode which includes a data collector, a data capturer and a data uploader. The data collector is configured to collect data provided by a data provider based on a first data policy. The data capturer is configured to capture the data collected by the data collector based on a second data policy. The data uploader is configured to handle the data captured by the data capturer based on a third data policy. The first data policy, the second data policy and the third data policy are configured separately according to IoT application requirements.

The present invention also provides an IoT gateway with configurable data transmission mode which includes a data collector, a first data capturer, a second data capturer, a first data uploader and a second data uploader. The data collector is configured to collect data provided by at least two data providers. The first data capturer is configured to capture the data collected by the data collector based on a first data policy. The second data capturer is configured to capture the data collected by the data collector based on a second data policy. The first data uploader is configured to handle the data captured by the first data capturer based on a third data policy. The second data uploader is configured to handle the data captured by the second data capturer based on a fourth data policy. The first data policy and the third data policy are configured separately according to a first IoT application requirement. The second data policy and the fourth data policy are configured separately according to a second IoT application requirement.

The present invention also provides a method of configuring a data transmission mode of an IoT gateway. The method includes a data collector in the IoT gateway collecting data provided by a data provider based on a first data policy, a first data capturer in the IoT gateway capturing the data collected by the data collector based on a second data policy, and a first data uploader in the IoT gateway handling the data captured by the first data capturer based on a third data policy, wherein the first data policy, the second data policy and the third data policy are configured separately according to IoT application requirements.

These and other objectives of the present invention will no doubt become obvious to those of ordinary skill in the art after reading the following detailed description of the preferred embodiment that is illustrated in the various figures and drawings.

DETAILED DESCRIPTION

Figure 3:
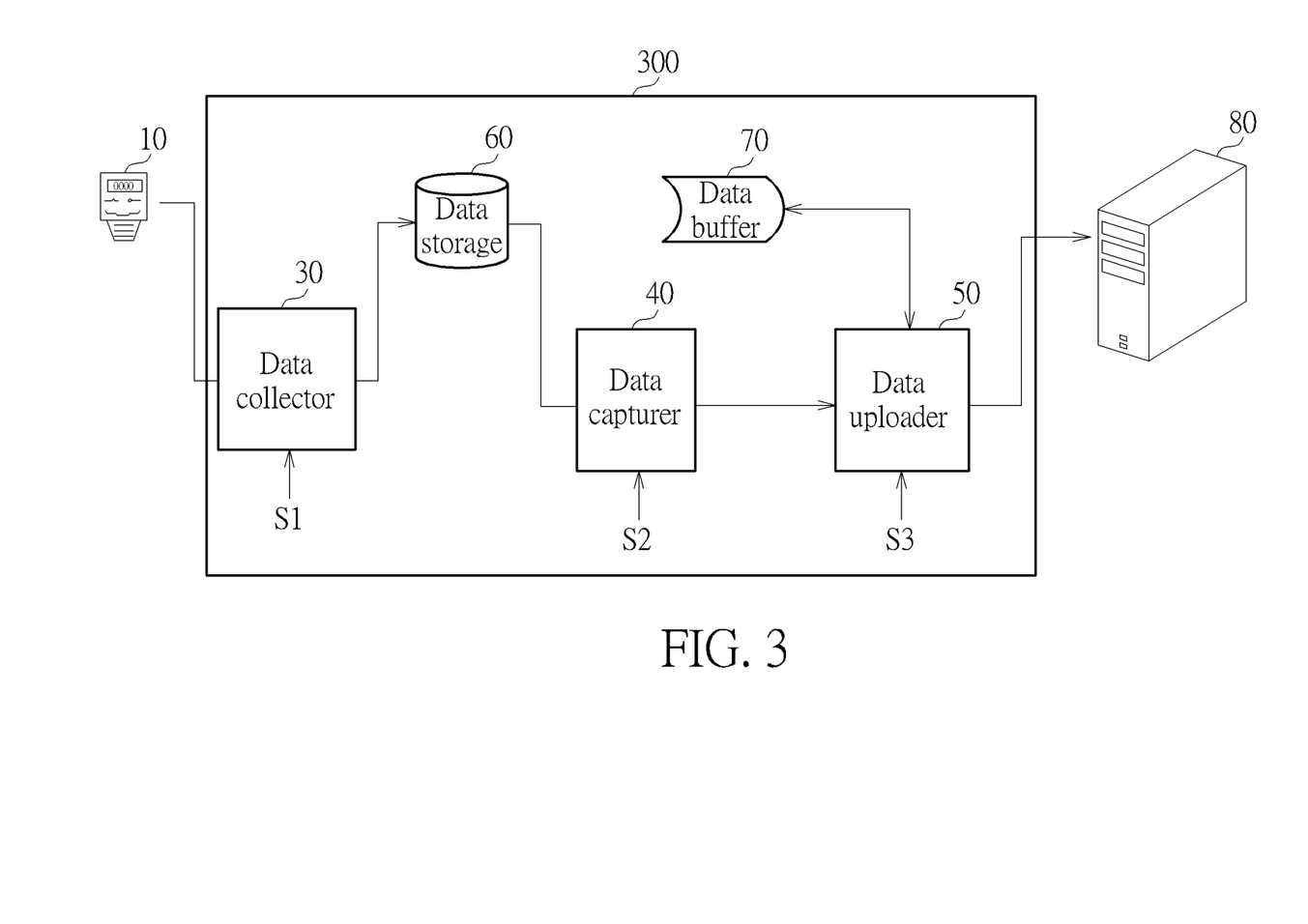
FIG. 3 is a diagram illustrating an IoT gateway with configurable data transmission mode according to an embodiment of the present invention.

FIG. 3 is a diagram illustrating an IoT gateway 300 with configurable data transmission mode according to an embodiment of the present invention. The IoT gateway 300 is coupled between a data provider 10 and a data receiver 80, and includes a data collector 30, a data capturer 40, a data uploader 50, a data storage 60, and a data buffer 70. The data collector 30 is configured to collect the data provided by the data provider 10 using a predetermined communication protocol based on a data policy S1, and transmit the collected data to the data storage 60. The data capturer 40 is configured to capture the data stored in the data storage 60 based on a data policy S2 and transmit the captured data to the data uploader 50 using a predetermined communication protocol. The data uploader 50 is configured to receive the data transmitted by the data capturer 40 and determine whether a transmission condition is satisfied based on a data policy S3. When it is determined that the transmission condition is not satisfied, the data uploader 50 is configured to transmit the data received from the data capturer 40 to the data buffer 70. When it is determined that the transmission condition is satisfied, the data uploader 50 is configured to access the data stored in the data buffer 70 and transmit the accessed data to the data receiver 80 using a predetermined communication protocol.

In the present invention, the data collector 30 may collect data from the data provider 10 using the Modbus data communication protocol, which is the most commonly used data transmission and communication protocol in the field of industrial control. In another embodiment, the data collector 30 may collect data from the data provider 10 using the open platform communication unified architecture (OPC-UA) protocol, EtherNet/IP protocol, EtherNet for control automation technology (EtherCAT) protocol, distributed network protocol (DNP) or building automation and control networks (BACNet) protocol. However, the type of the communication protocol adopted by the data collector 30 does not limit the scope of the present invention.

In an embodiment of the present invention, the data capturer 40 may transmit the captured data to the data uploader 50 using transmission control protocol (TCP) streaming, which is one of the main protocols of the Internet protocol suite and provides reliable, ordered, and error-checked delivery of a stream of octets (bytes) between applications running on hosts communicating via an IP network. In another embodiment, the data capturer 40 may transmit the captured data to the data uploader 50 using the inter process communication (IPC), remote procedure call (RPC), socket connection, or messaging protocol. However, the type of the communication protocol adopted by the data capturer 40 does not limit the scope of the present invention.

In an embodiment of the present invention, the data uploader 50 may transmit the accessed data to the data receiver 80 using the message queuing telemetry transport (MQTT) data communication protocol, which is an open OASIS and ISO standard (ISO/IEC 20922) lightweight, publish-subscribe network protocol that transports messages between devices. In another embodiment, the data uploader 50 may transmit the accessed data to the data receiver 80 using the advanced message queuing protocol (AMQP), constrained application protocol (CoAP) or hypertext transfer protocol (HTTP). However, the type of the communication protocol adopted by the data uploader 50 does not limit the scope of the present invention.

In the present invention, the data provider 10 may be a power meter or a Modbus slave, the data collector 30 may be a Modbus host, the data uploader 50 may be an MQTT publisher, and the data receiver 80 may be a cloud server or an MQTT broker. However, the types of the data provider 10, the data collector 30, the data uploader 50 and the data receiver 80 do not limit the scope of the present invention.

In the embodiment depicted in FIG. 3, S1 is a data policy based on which the data collector 30 is configured to collect data from the data provider 10. S2 is a data policy based on which the data capturer 40 is configured to capture the data stored in the data storage 60. S3 is a data policy based on which the data uploader 50 is configured to handle the data captured by the data capturer 40. In the present invention, adjustable variables may be placed at variable nodes in the IoT gateway 300 (such as at the data collector 30, the data capturer 40 and the data uploader 50) for changing various data policies (such as the data policies S1-S3) when the application requirement changes. This way, the data transmission mode of the IoT gateway 300 can be flexibly controlled by setting the variables without modifying the source codes.

In an embodiment of the present invention, the data policy S1 may include one or multiple collecting criteria associated with, but not limited to, the address/length, the frequency and the condition of data collection. For example, among the data provided by the data provider 10, the data collector 30 may collect data at a specific address (such as at address 0200), collect data having a specific length (such as data length of 2 bytes), collect data using a specific frequency (such as every one second), and/or collect data when a specific environmental condition is satisfied (such as when the temperature is higher than 38 C, or when the temperature is higher than 20 C and the wind speed is higher than 2000 rpm) based on the data policy S1. Next, the data collector 30 is configured to store the data which is collected based on the one or multiple criteria in the data policy S1 in the data storage 60. The above-mentioned examples of the collecting criteria are for illustrative purpose. However, the amount and the content of the collecting criteria in the data policy S1 do not limit the scope of the present invention.

In an embodiment of the present invention, the data policy S2 may include one or multiple capturing criteria associated with, but not limited to, the data name, the access frequency and the condition of data capturing. For example, among the data stored in the data storage 60, the data capturer 40 may capture the data whose name includes a specific keyword (such as having "temperature" or "wind speed" in the data name), capture data using a specific frequency (such as every 30 seconds), capture data when a specific environmental condition is satisfied (such as when the temperature is higher than 60 C), and/or capture data when a specific environmental parameter is updated (such as at each update of the temperature). Next, the data capturer 40 is configured to transmit the data captured based on the data policy S2 to the data uploader 50. The above-mentioned examples of the capturing criteria are for illustrative purpose. However, the amount and the content of the capturing criteria in the data policy S2 do not limit the scope of the present invention.

Figure 4:
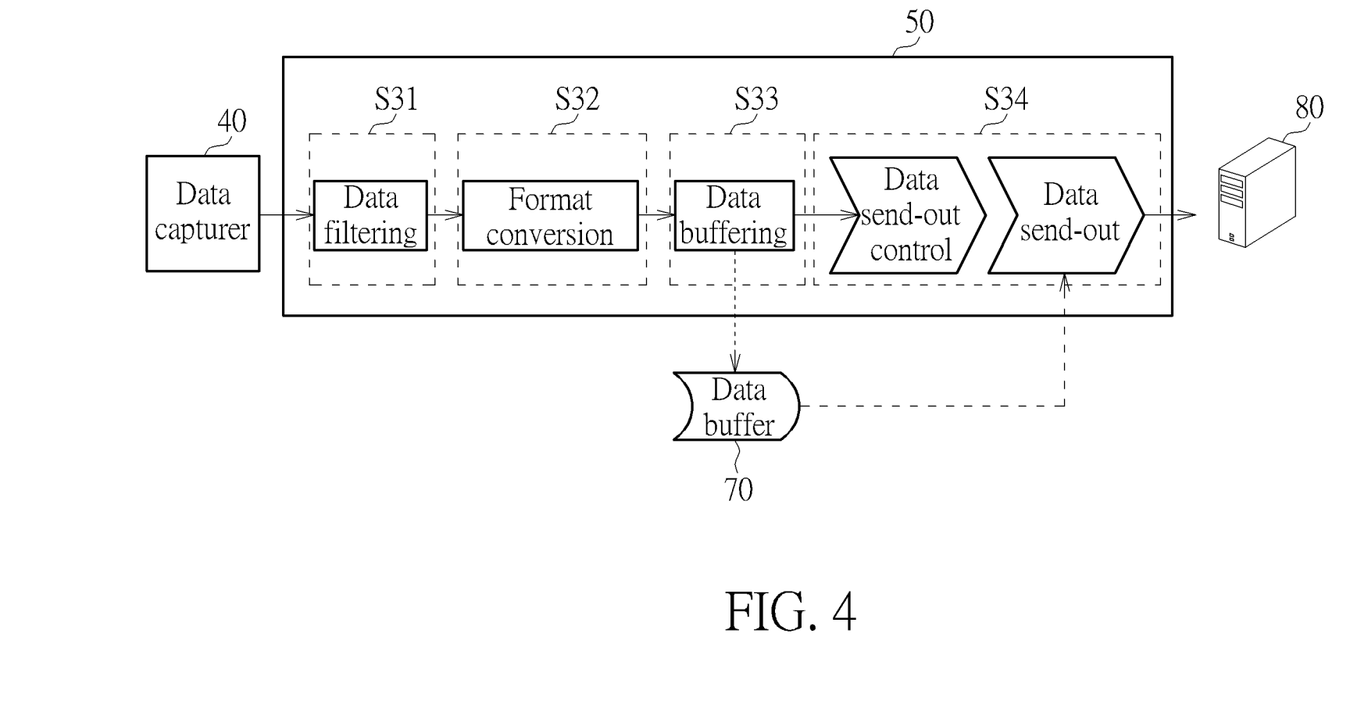
FIG. 4 is a diagram illustrating the detailed data movement between the data capturer and the data receiver in an IoT gateway according to an embodiment of the present invention.

FIG. 4 is a diagram illustrating the detailed data movement between the data capturer 40 and the data receiver 80 in the IoT gateway 300 according to an embodiment of the present invention. The data policy S3 may include one or multiple uploading criteria S31-S34, based on which the data uploader 50 is configured to handle the data stored in the data buffer 70. The following examples of the uploading criteria are for illustrative purpose. However, the amount and the content of the uploading criteria in the data policy S3 do not limit the scope of the present invention.

The uploading criteria S31 is associated with data filtering for determining whether the data received from the data capturer 40 should be stored in the data buffer 70. The condition of data filtering may be based on data value or data sequence. For example, among multiple pieces of data received from the data capturer 40, the data uploader 50 may only upload the data with maximum value, the data with minimum value, one or multiple pieces of data whose value are within a specific range, or the data with a specific sequential order (such as the last piece of data) into the data buffer 70.

The uploading criteria S32 is associated with data format transformation so that the data received from the data capturer 40 and in a first format may be converted into a second format which is compatible with the data receiver 80. For example, the data uploader 50 may convert the data from JSON format to XML format, or from JSON Array format to JSON Object.

The uploading criteria S33 is associated with data buffering. When one or multiple transmission conditions are not satisfied, the data uploader 50 is configured to upload the current data to the data buffer 70 for merging with existing data. The uploading criteria S34 is associated with data send-out and send-out control. When one or multiple transmission conditions are satisfied, the data uploader 50 is configured to upload the current data to the data receiver 80.

In the uploading criteria S33 and S34, the one or multiple transmission conditions are satisfied when, but not limited to, data is present in the data buffer 70, the size of data stored in the data buffer 70 is larger than a predetermined value, the time that data has been stored in the data buffer 70 is longer than a predetermined period, or receiving a data transmission command when data is present in the data buffer 70. For example, the data uploader 50 may upload the current data to the data receiver 80 the moment when data is present in the data buffer 70, when the size of data stored in the data buffer 70 exceeds 4 KB, when data has been stored in the data buffer 70 longer than 10 minutes, or when receiving a data transmission command while data is present in the data buffer 70. On the other hand, when none of the above-mentioned transmission conditions is satisfied, the data uploader 50 is configured to upload the current data to the data buffer 70 for merging with existing data, and upload the merged data to the data receiver 80 when any of the above-mentioned transmission conditions is satisfied.

Figure 5:
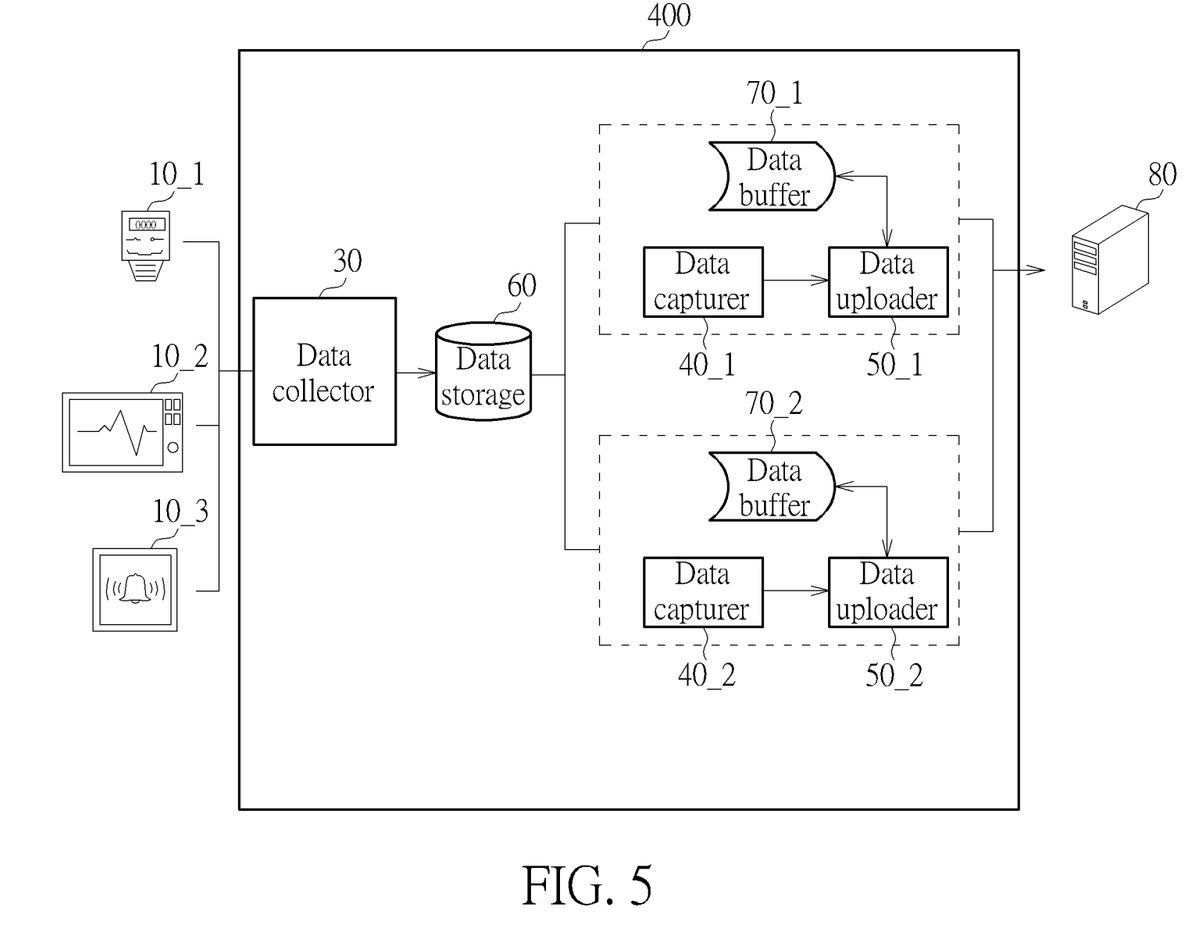
FIG. 5 is a diagram illustrating an IoT gateway according to another embodiment of the present invention.

FIG. 5 is a diagram illustrating an IoT gateway 400 according to another embodiment of the present invention. The IoT gateway 400 includes a data collector 30, the first through the $N^{th}$ data capturers 40_1-40_N, the first through the $N^{th}$ data uploaders 50_1-50_N, a data storage 60, and the first through the $N^{th}$ data buffers 70_1-70_N 72 coupled between data providers 10_1-10_M and a data receiver 80, wherein M and N are integers larger than 1. For illustrative purpose, FIG. 5 depicts the embodiment of M=3 and N=2. However, the values of M and N do not limit the scope of the present invention.

The data provider 10_1 may include one or multiple power meters or Modbus slaves, the data provider 10_2 may include one or multiple machine tools or servers, and the data provider 10_3 may include one or multiple BACNet-based fire alarm systems. The IoT gateway 400 may adopt various message groups for various IoT applications. For example, the first data capturer 40_1, the first data uploader 50_1 and the first data buffer 70_1 form a first message group which is designed based on the application requirement, data type, transmission bandwidth restriction or transmission cost of a first IoT project; the second data capturer 40_2, the second data uploader 50_2 and the second data buffer 70_2 form a second message group which is designed based on the application requirement, data type, transmission bandwidth restriction or transmission cost of a second IoT project.

In the embodiment illustrated in FIG. 5 when the IoT gateway 400 is implemented in a factory, the production line may include multiple machine tools. The power consumption of each machine tool when manufacturing a specific product is constantly monitored for creating a comparison table in order to detect abnormal machine tools. Under such circumstance, the first message group may be associated with non-urgent data collection over a long period of time. For example, the data policies may be set in a way so that the first data capturer 40_1 acquires the model number, the product number, the batch number, the production time and the production quantity of the machine tools by capturing the data provided by the data provider 10_2 and acquires the power consumption of the machine tools by capturing the data provided by the data provider 10_1 every minute. Also, the data policies may be set in a way so that the data uploader 50_1 uploads the current data to the data receiver 80 on a daily basis.

In the embodiment illustrated in FIG. 5 when the IoT gateway 400 is implemented in a factory, one or multiple BACNet-based fire alarm systems may be deployed to detect fire or smoke. Under such circumstance, the second message group may be associated with urgent data collection. For example, the data policies may be set in a way so that the data capturer 40_2 acquires alarm messages from the data provider 10_3 on a real-time basis, and the data uploader 50_2 uploads the current data to the data receiver 80 at each event occurrence.

In conclusion, in the IoT gateway of the present invention, the data collector, the data capturer and the data uploader are configured to operate based on respective data policies. Each data policy may be flexibly set according to IoT application requirements so as to adjust the data transmission mode of the IoT gateway without modifying the source codes.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An Internet of Things (IoT) gateway with configurable data transmission mode, comprising:
    a data collector configured to collect data provided by a data provider based on a first data policy;
    a data capturer configured to capture the data collected by the data collector based on a second data policy; and
    a data uploader configured to handle the data captured by the data capturer based on a third data policy, wherein the first data policy, the second data policy and the third data policy are configured separately according to IoT application requirements, wherein the second data policy includes at least one capturing criteria, based on which the data capturer is further configured to capture the data collected by the data collector using a specific frequency, capture the data collected by the data collector when a specific environmental condition is satisfied, or capture the data collected by the data collector when a specific environmental parameter is updated.

2. The IoT gateway of claim 1, wherein the first data policy includes at least one collecting criteria, based on which the data collector is further configured to collect data having a specific address from the data provided by the data provider, collect data having a specific length from the data provided by the data provider, collect the data provided by the data provider using a specific frequency, or collect the data provided by the data provider when a specific environmental condition is satisfied.

3. The IoT gateway of claim 1, wherein based on the at least one capturing criteria, the data capturer is further configured to capture data having a specific name from the data collected by the data collector.

4. The IoT gateway of claim 1, wherein the third data policy includes a first uploading criteria, based on which the data uploader is further configured to upload data having a maximum value, data having a minimum value, data having a specific value, one or multiple pieces of data within a specific range, or data having a specific sequential order among the data captured by the data capturer.

5. The IoT gateway of claim 4, wherein the third data policy further includes a second uploading criteria, based on which the data uploader is further configured to convert the data captured by the data capturer from a first format into a second format.

6. The IoT gateway of claim 4, further comprising a data buffer, wherein the third data policy further includes a third uploading criteria, based on which the data uploader is further configured to upload the data captured by the data capturer to the data buffer.

7. The IoT gateway of claim 6, wherein:
    the third data policy further includes at least one transmission condition which is satisfied when data is present in the data buffer, when a size of data stored in the data buffer is larger than a predetermined value, when data has been stored in the data buffer for a period shorter than a predetermined value, or when receiving a data transmission command while the data is present in the data buffer; and
    the data uploader is further configured to upload the data captured by the data capturer to the data buffer when determining that the at least one transmission condition is not satisfied.

8. The IoT gateway of claim 6, wherein the third data policy further includes a fourth uploading criteria, based on which the data uploader is further configured to upload the data stored in the data buffer to a data receiver.

9. The IoT gateway of claim 8, wherein:
    the fourth uploading criteria further includes at least one transmission condition which is satisfied when data is present in the data buffer, when a size of data stored in the data buffer is larger than a predetermined value, when data has been stored in the data buffer for a period shorter than a predetermined value, or when receiving a data transmission command while the data is present in the data buffer; and
    the data uploader is further configured to upload the data captured by the data capturer to the data receiver when determining that the at least one transmission condition is satisfied.

10. The IoT gateway of claim 1, further comprising:
    a data storage for storing the data collected by the data collector from the data provider.

11. An Internet of Things (IoT) gateway with configurable data transmission mode, comprising:
    a data collector configured to collect data provided by at least two data providers;
    a first data capturer configured to capture the data collected by the data collector based on a first data policy;
    a second data capturer configured to capture the data collected by the data collector based on a second data policy;
    a first data uploader configured to handle the data captured by the first data capturer based on a third data policy; and
    a second data uploader configured to handle the data captured by the second data capturer based on a fourth data policy, wherein the first data policy and the third data policy are configured separately according to a first IoT application requirement, and the second data policy and the fourth data policy are configured separately according to a second IoT application requirement, wherein the first data policy and the second data policy include at least one capturing criteria, based on which the first data capturer and the second data capturer are further configured to capture the data collected by the data collector using a specific frequency, capture the data collected by the data collector when a specific environmental condition is satisfied, or capture the data collected by the data collector when a specific environmental parameter is updated.

12. A method of configuring a data transmission mode of an IoT gateway, comprising:
- a data collector in the IoT gateway collecting data provided by a data provider based on a first data policy;
- a first data capturer in the IoT gateway capturing the data collected by the data collector based on a second data policy; and
- a first data uploader in the IoT gateway handling the data captured by the first data capturer based on a third data policy, wherein the first data policy, the second data policy and the third data policy are configured separately according to IoT application requirements, wherein the second data policy includes at least one capturing criteria, based on which the data capturer is further configured to capture the data collected by the data collector using a specific frequency, capture the data collected by the data collector when a specific environmental condition is satisfied, or capture the data collected by the data collector when a specific environmental parameter is updated.

13. The method of claim 12, wherein the first data policy includes at least one collecting criteria, the method further comprising:
- the data collector further collecting data having a specific address from the data provided by the data provider, collecting data having a specific length from the data provided by the data provider, collecting the data provided by the data provider using a specific frequency, or collecting the data provided by the data provider when a specific environmental condition is satisfied based on the at least one collecting criteria.

14. The method of claim 12, wherein the method further comprising:
- the first data capturer further capturing data having a specific name from the data collected by the data collector based on the at least one capturing criteria.

15. The method of claim 12, wherein the third data policy includes a first uploading criteria, the method further comprising:
- the first data uploader further uploading data having a maximum value, data having a minimum value, data having a specific value, one or multiple pieces of data within a specific range, or data having a specific sequential order among the data captured by the first data capturer based on the first uploading criteria.

16. The method of claim 15, wherein the third data policy further includes a second uploading criteria, the method further comprising:
- the first data uploader further converting the data captured by the first data capturer from a first format into a second format.

17. The method of claim 15, wherein the third data policy further includes a third uploading criteria, the method further comprising:
- the first data uploader further uploading the data captured by the first data capturer to a data buffer based on the third uploading criteria.

18. The method of claim 17, wherein the third data policy further includes at least one transmission condition which is satisfied when data is present in the data buffer, when a size of data stored in the data buffer is larger than a predetermined value, when data has been stored in the data buffer for a period shorter than a predetermined value, or when receiving a data transmission command while the data is present in the data buffer, the method further comprising:
- the first data uploader further uploading the data captured by the first data capturer to the data buffer when the at least one transmission condition is not satisfied.

19. The method of claim 17, wherein the third data policy further includes a fourth uploading criteria, the method further comprising:
- the first data uploader further uploading the data stored in the data buffer to a data receiver based on the fourth uploading criteria.

20. The method of claim 19, wherein the fourth uploading criteria further includes at least one transmission condition which is satisfied when data is present in the data buffer, when a size of data stored in the data buffer is larger than a predetermined value, when data has been stored in the data buffer for a period shorter than a predetermined value, or when receiving a data transmission command while the data is present in the data buffer, the method further comprising:
- the first data uploader further uploading the data captured by the first data capturer to the data receiver when determining that the at least one transmission condition is satisfied.

21. The method of claim 12, further comprising:
- the data collector storing the data collected from the data provider in a data storage.

22. The method of claim 12, further comprising:
- the data collector collecting data provided by at least two data providers;
- a second data capturer in the IoT gateway capturing the data collected by the data collector based on a fourth data policy; and
- a second data uploader handling the data captured by the second data capturer based on a fifth data policy, wherein the second data policy and the fourth data policy are configured separately according to a first IoT application requirement, and the third data policy and the fifth data policy are configured separately according to a second IoT application requirement.

* * * * *